United States Patent
Rettner et al.

(10) Patent No.: US 12,548,694 B2
(45) Date of Patent: Feb. 10, 2026

(54) THERMALIZATION OF A CRYOGENIC FLEX CABLE USING A THERMALLY CONDUCTIVE CLADDING

(71) Applicant: INTERNATIONAL BUSINESS MACHINES CORPORATION, Armonk, NY (US)

(72) Inventors: Charles Thomas Rettner, San Jose, CA (US); Jen-Hao Yeh, White Plains, NY (US); Daniel Rugar, Los Altos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 18/534,439

(22) Filed: Dec. 8, 2023

(65) Prior Publication Data

US 2025/0191815 A1 Jun. 12, 2025

(51) Int. Cl.
| | | |
|---|---|---|
| *H01B 12/00* | (2006.01) | |
| *H01B 12/16* | (2006.01) | |
| *H01B 13/22* | (2006.01) | |
| *H10N 60/81* | (2023.01) | |

(52) U.S. Cl.
CPC .......... *H01B 12/16* (2013.01); *H01B 13/227* (2013.01); *H10N 60/81* (2023.02)

(58) Field of Classification Search
CPC ....... H01B 12/16; H01B 13/227; H10N 60/81
See application file for complete search history.

(56) References Cited

U.S. PATENT DOCUMENTS

| | | | |
|---|---|---|---|
| 4,761,517 A | 8/1988 | Massit et al. | |
| 5,248,365 A | 9/1993 | Kamioka | |
| 6,045,396 A | 4/2000 | Tighe | |
| 9,875,826 B2 | 1/2018 | Radovinsky | |
| 10,141,493 B2 | 11/2018 | Tuckerman | |
| 10,453,592 B1 * | 10/2019 | Smith | H02G 3/0462 |
| 11,488,747 B2 * | 11/2022 | van der Laan | H01B 12/16 |

(Continued)

FOREIGN PATENT DOCUMENTS

| | | |
|---|---|---|
| EP | 3745481 B1 | 9/2021 |
| KR | 10-2022-0106990 A | 8/2022 |

(Continued)

OTHER PUBLICATIONS

International Search Report and Written Opinion, International Application No. PCT/EP2024/084447, dated Feb. 26, 2025, 14 pages.

(Continued)

*Primary Examiner* — Pete T Lee
(74) *Attorney, Agent, or Firm* — Amin, Turocy & Watson, LLP

(57) ABSTRACT

A system includes a cable passing from a first plate to a second plate via an intermediate plate, an attachment coupling the cable to the intermediate plate, and a conductive cladding connected to an outer surface of the cable and extended a first length from the attachment toward the second plate. The total length of the thermally conductive cladding is larger than the total length of the attachment, and the cable is thermally connected to the first plate, the second plate, and the intermediate plate.

19 Claims, 14 Drawing Sheets

(56) References Cited

U.S. PATENT DOCUMENTS

| | | | |
|---|---|---|---|
| 2011/0209892 A1* | 9/2011 | Metz | H01B 11/1843 |
| | | | 174/102 R |
| 2018/0294401 A1* | 10/2018 | Tuckerman | H10N 60/80 |
| 2023/0007816 A1 | 1/2023 | Tournabien et al. | |
| 2023/0014966 A1 | 1/2023 | Snow et al. | |
| 2023/0090979 A1 | 3/2023 | Matthews et al. | |

FOREIGN PATENT DOCUMENTS

| | | |
|---|---|---|
| KR | 10-2022-0146481 A | 11/2022 |
| WO | 2023/089233 A1 | 5/2023 |
| WO | 2025/119882 A1 | 6/2025 |

OTHER PUBLICATIONS

Rugar, D. "Thermalization of Flex Wiring at a Clamped Heat Sink", IBM (2023), 6 pgs.

\* cited by examiner

THERMALIZATION OF A CRYOGENIC FLEX CABLE USING A THERMALLY CONDUCTIVE CLADDING

BACKGROUND

Technical Field

The present disclosure generally relates to thermalization, and more particularly, to thermalization of a cryogenic flex cable to an intermediate temperature plate using a thermally conductive cladding structure, and methods of creation thereof.

Description of the Related Art

In a dilution refrigerator, flexible cables, often referred to as "flex cables," play a salient role the cryogenic system. Dilution refrigerators are used to achieve extremely low temperatures, typically in the millikelvin range, and they are commonly used in scientific research, particularly in the field of low-temperature physics. Flex cables also carry undesirable heat from higher temperature stages toward lower temperature stages, such as the mixing chamber stage in the dilution refrigerator. Typically, the flex cable is cooled at various intermediate temperature points in order to reduce the heat flow to the mixing chamber stage.

SUMMARY

According to an embodiment, a system includes a cable passing from a first plate to a second plate via an intermediate plate, an attachment coupling the cable to the intermediate plate, and a thermally conductive cladding connected to an outer surface of the cable and extended a first length from the attachment toward the second plate. A total length of the thermally conductive cladding is larger than a total length of the attachment. The cable is thermally connected to the first plate, the second plate, and the intermediate plate.

In some embodiments, which can be combined with the previous embodiment, the cable includes an intermediate layer separating the outer layer and an inner layer, and a length of the thermally conductive cladding is determined by $L_c = A \, L_t$ and:

$$L_t = \left(\frac{K_w}{K_i} \frac{t_w t_i}{n_{sides}}\right)^{1/2}$$

$K_w$ and $K_i$ are thermal conductivities of the inner layer and the intermediate layer, respectively;

$t_w$ and $t_i$ are thicknesses of the inner layer and the intermediate layer, respectively;

$n_{sides}$ is 1 when the thermally conductive cladding is applied on one side of the flex cable, and 2, when the thermally conductive cladding is applied on two sides of the flex cable; and A is a multiplier between 2 and 6.

In some embodiments, which can be combined with one or more previous embodiments, the multiplier A is determined by $$A = 3.4 \log(L_0 / L_t)$$

where $L_0$ is a distance from the intermediate plate to the second plate.

In some embodiments, which can be combined with one or more previous embodiments, a length of the thermally conductive cladding is determined by finite element calculations to minimize heat flow to the second plate.

In some embodiments, which can be combined with one or more previous embodiments, the thermally conductive cladding includes a first material with a first thermal conductivity, and the outer layer includes a second material with a second thermal conductivity. The first thermal conductivity is higher than the second thermal conductivity.

In some embodiments, which can be combined with one or more previous embodiments, the first plate is at a first temperature, the second plate is at a second temperature, and the second temperature is lower than the first temperature.

In some embodiments, which can be combined with one or more previous embodiments, the intermediate plate is at a third temperature that is between the first temperature and the second temperature.

In some embodiments, which can be combined with one or more previous embodiments, the thermally conductive cladding is configured to decrease a heat load to the second plate when the thermal conduction to the intermediate plate is increased.

In some embodiments, which can be combined with one or more previous embodiments, the thermally conductive cladding is further extended a second length from the attachment toward the first plate, and the first length is larger than the second length.

According to another embodiment, a system includes a cable connecting a first plate and a second plate via an intermediate plate. The first plate is at a first temperature and the second plate is at a second temperature, the second temperature being lower than the first temperature. The system further includes an attachment connecting the cable to the intermediate plate, and a thermally conductive cladding connected to the cable. The thermally conductive cladding is extended a first length from the attachment toward the first plate.

In some embodiments, which can be combined with one or more previous embodiments, the intermediate plate is at an intermediate temperature between the first temperature and the second temperature.

In some embodiments, which can be combined with one or more previous embodiments, the cable comprises an intermediate layer separating an outer layer and an inner layer, and wherein a length of the thermally conductive cladding is determined by $L_c = A \, L_t$ and $$L_t = \left(\frac{K_w}{K_i} \frac{t_w t_i}{n_{sides}}\right)^{1/2}$$

wherein:

$K_w$ and $K_j$ are thermal conductivities of the inner layer and the intermediate layer, respectively;

$t_w$ and $t_i$ are thicknesses of the inner layer and the intermediate layer, respectively;

$n_{sides}$ is 1 when the thermally conductive cladding is applied on one side of the flex cable, and 2, when the thermally conductive cladding is applied on two sides of the flex cable; and A is a multiplier between 2 and 6.

In some embodiments, which can be combined with one or more previous embodiments, the multiplier A is determined by $$A = 3.4 \log(L_0/L_t)$$

where $L_0$ is the distance from the intermediate plate to the second plate.

In some embodiments, which can be combined with one or more previous embodiments, a length of the thermally conductive cladding is determined by finite element calculations to minimize heat flow to the second plate.

In some embodiments, which can be combined with one or more previous embodiments, the thermally conductive cladding includes a first material with a first thermal conductivity, the outer layer includes a second material with a second thermal conductivity, and the first thermal conductivity is higher than the second thermal conductivity.

According to yet another embodiment, a method of fabricating a flex cable includes determining a length of a thermally conductive cladding to minimize heat flow to within the flex cable, and forming the thermally conductive cladding over the flex cable.

In some embodiments, which can be combined with the previous embodiment, forming the flex cable further comprises passing from a first plate to a second plate via an intermediate plate, thermally connecting the flex cable to the first plate, the second plate, and the intermediate plate attaching the flex cable to the intermediate plate via an attachment, wherein the flex cable comprises an inner layer, and an outer layer separated by an intermediate layer, and wherein determining a length of the thermally conductive cladding is performed based on $L_c = A L_t$ and $$L_t = \left(\frac{K_w}{K_i} \frac{t_w t_i}{n_{sides}}\right)^{1/2}$$

wherein:
$K_w$ and $K_i$ are thermal conductivities of the inner layer and the intermediate layer, respectively;
$t_w$ and $t_i$ are thicknesses of the inner layer and the intermediate layer, respectively;
$n_{sides}$ is 1 when the thermally conductive cladding is applied on one side of the flex cable, and 2, when the thermally conductive cladding is applied on two sides of the flex cable; and
A is a multiplier between 2 and 6.

In some embodiments, which can be combined with one or more previous embodiments, the method includes determining the multiplier A by $$A = 3.4 \log(L_0/L_t)$$

where $L_0$ is the distance from the intermediate plate to the second plate.

In some embodiments, which can be combined with one or more previous embodiments, a length of the thermally conductive cladding is determined by finite element calculations to minimize heat flow to the second plate.

In some embodiments, which can be combined with one or more previous embodiments, the method includes extending the thermally conductive cladding a second length from the attachment toward the first plate.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
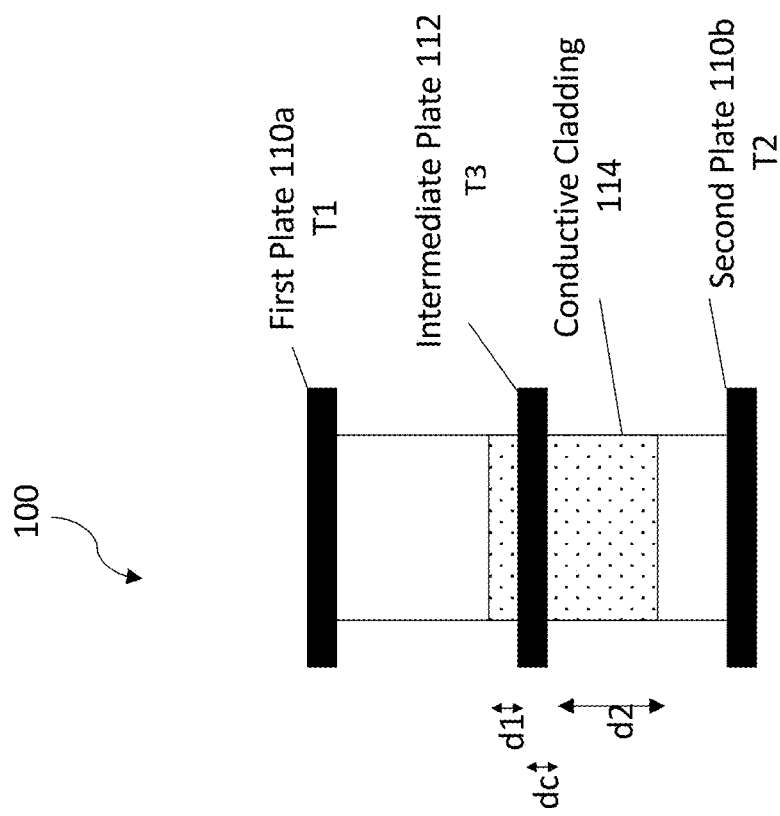
FIG. 1 illustrates a simplified view of the flex cable with thermally conductive cladding, in accordance with some embodiments.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, spatially related terminology such as "front," "back," "top," "bottom," "beneath," "below," "lower," above," "upper," "side," "left," "right," and the like, is used with reference to the orientation of the Figures being described. Since components of embodiments of the disclosure can be positioned in a number of different orientations, the directional terminology is used for purposes of illustration and is in no way limiting. Thus, it will be understood that the spatially relative terminology is intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

As used herein, the terms "lateral" and "horizontal" describe an orientation parallel to a first surface of an element.

As used herein, the term "vertical" describes an orientation that is arranged perpendicular to the first surface of an element.

As used herein, the terms "coupled" and/or "electrically coupled" are not meant to mean that the elements must be directly coupled together-intervening elements may be provided between the "coupled" or "electrically coupled" elements. In contrast, if an element is referred to as being "directly connected" or "directly coupled" to another element, there are no intervening elements present. The term "electrically connected" refers to a low-ohmic electric connection between the elements electrically connected together.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Example embodiments are described herein with reference to cross-sectional illustrations that are schematic illustrations of idealized or simplified embodiments (and intermediate structures). As such, variations from the shapes of the illustrations as a result, for example, of manufacturing techniques and/or tolerances, may be expected. Thus, the regions illustrated in the figures are schematic in nature and their shapes do not necessarily illustrate the actual shape of a region of a device and do not limit the scope.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

As used herein, certain terms are used indicating what may be considered an idealized behavior, such as, for example, "lossless," "superconductor," or "superconducting," which are intended to cover functionality that may not be exactly ideal but is within acceptable margins for a given application. For example, a certain level of loss or tolerance may be acceptable such that the resulting materials and structures may still be referred to by these "idealized" terms.

According to an embodiment, a system includes a cable passing from a first plate to a second plate via an intermediate plate, an attachment coupling the cable to the intermediate plate, and a thermally conductive cladding connected to an outer surface of the cable and extended a first length from the attachment toward the second plate. A total length of the thermally conductive cladding is larger than a total length of the attachment. The cable is thermally connected to the first plate, the second plate, and the intermediate plate. The longer thermally conductive cladding creates a larger surface to transfer heat from the flex cable to the intermediate plate.

In some embodiments, which can be combined with the previous embodiment, the cable includes an intermediate layer separating the outer layer and an inner layer, and a length of the thermally conductive cladding is determined by $L_c = A L_t$ and:

$$L_t = \left( \frac{K_w}{K_i} \frac{t_w t_i}{n_{sides}} \right)^{1/2}$$

$K_w$ and $K_i$ are thermal conductivities of the inner layer and the intermediate layer, respectively;

$t_w$ and $t_i$ are thicknesses of the inner layer and the intermediate layer, respectively;

$n_{sides}$ is 1 when the thermally conductive cladding is applied on one side of the flex cable, and 2, when the thermally conductive cladding is applied on two sides of the flex cable; and A is a multiplier between 2 and 6. The multilayered structure of the cable can enhance the electrical properties and the structural and mechanical stability of the cable as well as controlling the heat transfer.

In some embodiments, which can be combined with one or more previous embodiments, the multiplier A is determined by:

$$A = 3.4 \log (L_0/L_t)$$

where $L_0$ is a distance from the intermediate plate to the second plate. By using analytical equation, an optimal length of the thermally conductive cladding can be determined.

In some embodiments, which can be combined with one or more previous embodiments, a length of the thermally conductive cladding is determined by finite element calculations to minimize heat flow to the second plate. Alternatively, by utilizing simulations, an optimal length of the thermally conductive cladding can be determined.

In some embodiments, which can be combined with one or more previous embodiments, the thermally conductive cladding includes a first material with a first thermal conductivity, and the outer layer includes a second material with a second thermal conductivity. The first thermal conductivity is higher than the second thermal conductivity. Thus, the thermally conductive cladding enhances the heat transfer from the cable to the intermediate plate.

In some embodiments, which can be combined with one or more previous embodiments, the first plate is at a first temperature, the second plate is at a second temperature, and the second temperature is lower than the first temperature. The cable is designed to drop the temperature to as close as possible to the second temperature, at a shorter distance from the first plate.

In some embodiments, which can be combined with one or more previous embodiments, the intermediate plate is at a third temperature that is between the first temperature and the second temperature. Thus, the intermediate plate can be cooler than the first plate.

In some embodiments, which can be combined with one or more previous embodiments, the thermally conductive cladding is configured to decrease a heat load to the second plate when the thermal conduction to the intermediate plate is increased. Thus, the thermally conductive cladding can enhance the overall performance of the flex cable.

In some embodiments, which can be combined with one or more previous embodiments, the thermally conductive cladding is further extended a second length from the attachment toward the first plate. Thus, the thermally conductive cladding provides a larger surface for heat conduction from the cable.

According to another embodiment, a system includes a cable connecting a first plate and a second plate via an intermediate plate. The first plate is at a first temperature and the second plate is at a second temperature, the second temperature being lower than the first temperature. The system further includes an attachment connecting the cable to the intermediate plate, and a thermally conductive cladding connected to the cable. The thermally conductive cladding is extended a first length from the attachment toward the first plate and a second length from the attachment toward the second plate. The first plate is at a first temperature and the second plate is at a second temperature, the second temperature being lower than the first temperature. The longer thermally conductive cladding creates a larger surface to transfer heat from the cable.

In some embodiments, which can be combined with one or more previous embodiments, the intermediate plate is at an intermediate temperature between the first temperature and the second temperature. The multilayered structure of the cable can enhance the electrical properties and the structural and mechanical stability of the cable as well as controlling the heat transfer. In some embodiments, which can be combined with one or more previous embodiments, the cable comprises an intermediate layer separating an outer layer and an inner layer, and a length of the thermally conductive cladding is determined by $L_c = A\, L_t$ and $$L_t = \left(\frac{K_w}{K_i} \frac{t_w t_i}{n_{sides}}\right)^{1/2}$$

wherein:
$K_w$ and $K_i$ are thermal conductivities of the inner layer and the intermediate layer, respectively;
$t_w$ and $t_i$ are thicknesses of the inner layer and the intermediate layer, respectively;
$n_{sides}$ is 1 when the thermally conductive cladding is applied on one side of the flex cable, and 2, when the thermally conductive cladding is applied on two sides of the flex cable; and
A is a multiplier between 2 and 6. The multilayered structure of the cable can enhance the electrical properties and the structural and mechanical stability of the cable as well as controlling the heat transfer.

In some embodiments, which can be combined with one or more previous embodiments, the multiplier A is determined by $$A = 3.4 \log(L_0/L_t)$$

where $L_0$ is the distance from the intermediate plate to the second plate. By using analytical equation, an optimal length of the thermally conductive cladding can be determined.

In some embodiments, which can be combined with one or more previous embodiments, a length of the thermally conductive cladding is determined by finite element calculations to minimize heat flow to the second plate. Thus, by utilizing numerical simulations, an optimal length of the thermally conductive cladding can be determined.

In some embodiments, which can be combined with one or more previous embodiments, the thermally conductive cladding includes a first material with a first thermal conductivity, the outer layer includes a second material with a second thermal conductivity, and the first thermal conductivity is higher than the second thermal conductivity. Thus, the thermally conductive cladding enhances the heat transfer from the cable to the intermediate plate.

According to yet another embodiment, a method of fabricating a flex cable includes determining a length of a thermally conductive cladding to minimize heat flow to the second plate, and forming the thermally conductive cladding over the flex cable. The longer thermally conductive cladding creates a larger surface to transfer heat from the cable.

In some embodiments, which can be combined with the previous embodiment, fabricating the flex cable further comprises passing from a first plate to a second plate via an intermediate plate, thermally connecting the flex cable to the first plate, the second plate, and the intermediate plate attaching the flex cable to the intermediate plate via an attachment, wherein the flex cable comprises an inner layer, and an outer layer separated by an intermediate layer, and wherein determining a length of the thermally conductive cladding is performed based on $L_c = A\, L_t$ and $$L_t = \left(\frac{K_w}{K_i} \frac{t_w t_i}{n_{sides}}\right)^{1/2}$$

wherein:
$K_w$ and $K_i$ are thermal conductivities of the inner layer and the intermediate layer, respectively;
$t_w$ and $t_i$ are thicknesses of the inner layer and the intermediate layer, respectively;
$n_{sides}$ is 1 when the thermally conductive cladding is applied on one side of the flex cable, and 2, when the thermally conductive cladding is applied on two sides of the flex cable; and
A is a multiplier between 2 and 6. The multilayered structure of the cable can enhance the electrical properties and the structural and mechanical stability of the cable as well as controlling the heat transfer.

In some embodiments, which can be combined with one or more previous embodiments, the method includes determining the multiplier A by $$A = 3.4 \log(L_0/L_t)$$

where $L_0$ is the distance from the intermediate plate to the second plate. By using analytical equation, an optimal length of the thermally conductive cladding can be determined.

In some embodiments, which can be combined with one or more previous embodiments, a length of the thermally conductive cladding is determined by finite element calculations to minimize heat flow to the second plate. Thus, by utilizing numerical simulations, an optimal length of the thermally conductive cladding can be determined.

In some embodiments, which can be combined with one or more previous embodiments, the method includes extending the thermally conductive cladding a second length from the attachment toward the first plate. Thus, the thermally conductive cladding provides a larger surface to transfer heat from the cable.

The concepts herein relate to cables that carry electrical signals from a high temperature stage to a low temperature stage in a cryogenic dilution refrigerator, or dilution refrigerators for simplicity. A dilution refrigerator is a highly specialized cooling device used in low-temperature physics and other scientific research applications to achieve extremely low temperatures. The dilution refrigerator is designed to cool samples and experimental setups to temperatures in the millikelvin (mK) range, making it one of the coldest cooling methods available.

Operation of a dilution refrigerator is based on the dilution principle, which can involve the mixing of two isotopes of helium, helium-3 ($^3$He) and helium-4 ($^4$He), to produce a refrigerant. This process is called "dilution." The mixture forms a low-temperature bath known as the dilute phase while extracting heat from the surroundings. Unlike traditional cryogenic systems that reach a specific temperature and then require re-cooling, dilution refrigerators can provide continuous and stable cooling, and are capable of maintaining temperatures below 100 mK for extended periods.

A typical dilution refrigerator includes several key components, including: mixing chamber, where the helium isotopes are mixed, leading to the production of the dilute phase; dilution unit which contains a porous plug or a capillary system that allows the helium isotopes to mix; heat exchangers used to pre-cool the incoming helium gases and extract heat from the sample or experimental setup; a pumping system used to evacuate the helium gases and maintain the low-pressure environment necessary for the dilution process; and temperature sensors to monitor and control the temperature at various points within the refrigerator.

Dilution refrigerators are well-suited for experiments that involve minimal electromagnetic interference (EMI) and vibrations, and are often installed in shielded enclosures to reduce external noise and disturbances. Dilution refrigerators are used in a wide range of scientific experiments, including investigations into quantum phenomena, condensed matter physics, superconductivity, and astrophysics. Dilution refrigerators are essential for reaching the ultra-low temperatures required for studying certain quantum states and exotic materials. Such systems are highly complex and require careful design, construction, and maintenance.

Thermalization refers to the process by which various materials and structures within the dilution refrigerator, including the helium refrigerant, reach thermal equilibrium with the other structures or surfaces in the dilution refrigerator. This process is important for achieving and maintaining the low temperatures required for scientific experiments conducted in dilution refrigerators. The cables that carry electrical signals in the dilution refrigerator may be individual coax cables or ribbon-like flex cables that carry single or multiple signal wires. Typically, the signal wires are embedded in an electrically insulating dielectric that is surrounded by an electrically conducting shield. The signal wire is typically an electrical conductor (e.g., copper) in order to transmit electrical signals with minimal loss. However, the electrical conductivity of the wire will be accompanied by high thermal conductivity, which may cause undesirable transmission of thermal energy (heat) from the high temperature stage to the lower temperature stage.

To minimize the heat flow to the low temperature stage, the flex cable can be clamped to an intermediate plate that is at an intermediate temperature between the high temperature stage and the low temperature stage. Theoretically, the clamp would draw heat from the wire and thermalize the wire to the temperature of the intermediate plate. However, because of the poor thermal conductivity of the dielectric and the high thermal conductivity of the wire, the thermalization of the wire to the temperature of the intermediate plate may be inadequate. The poor thermalization of the wire at the intermediate plate will cause excessive and undesirable heat flow to the low temperature stage.

To tackle the above-mentioned and other problems, disclosed is a dilution refrigerator device including a set of plates and a flex cable, with a conductive cladding that extends from a clamping plate along the length of the flex cable while being substantially thermalized to the temperature of the plate to which it is clamped. Such a dilution refrigerator can extend the length over which heat can be transported from the signal lines back to the clamping plate. Moreover, the presence of such a conductive cladding can cause the signal lines to cool to close to the clamping plate temperature, compared to the situation where the thermally conductive cladding layer is absent.

In various embodiments, the disclosed flex cable with thermally conductive cladding adds a thermally conductive metal cladding to the cable over a length sufficient to enhance the thermalization of the wire to the temperature of the intermediate plate. The addition of the thermally conductive cladding extends the area over which heat flows out of the wire back to the clamp and allows the signal wire to equilibrate to the temperature of the intermediate stage.

Accordingly, the teachings herein provide methods and systems of a thermally accommodated cryogenic flex cable in a dilution refrigerator using a conductive cladding structure. The techniques described herein may be implemented in a number of ways. Example implementations are provided below with reference to the following figures.

Example Flex Cable with Thermally Conductive Cladding Structure

Figure 2:
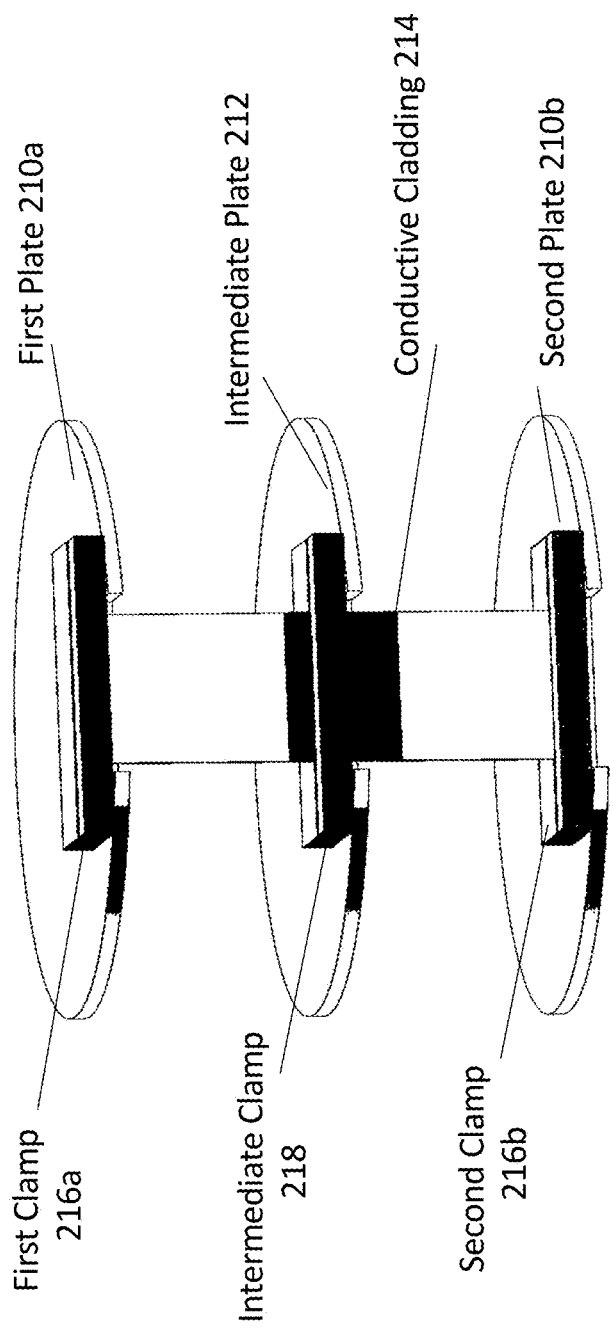
FIG. 2 illustrates the flex cable with thermally conductive cladding, in accordance with some embodiments.
Figure 3:
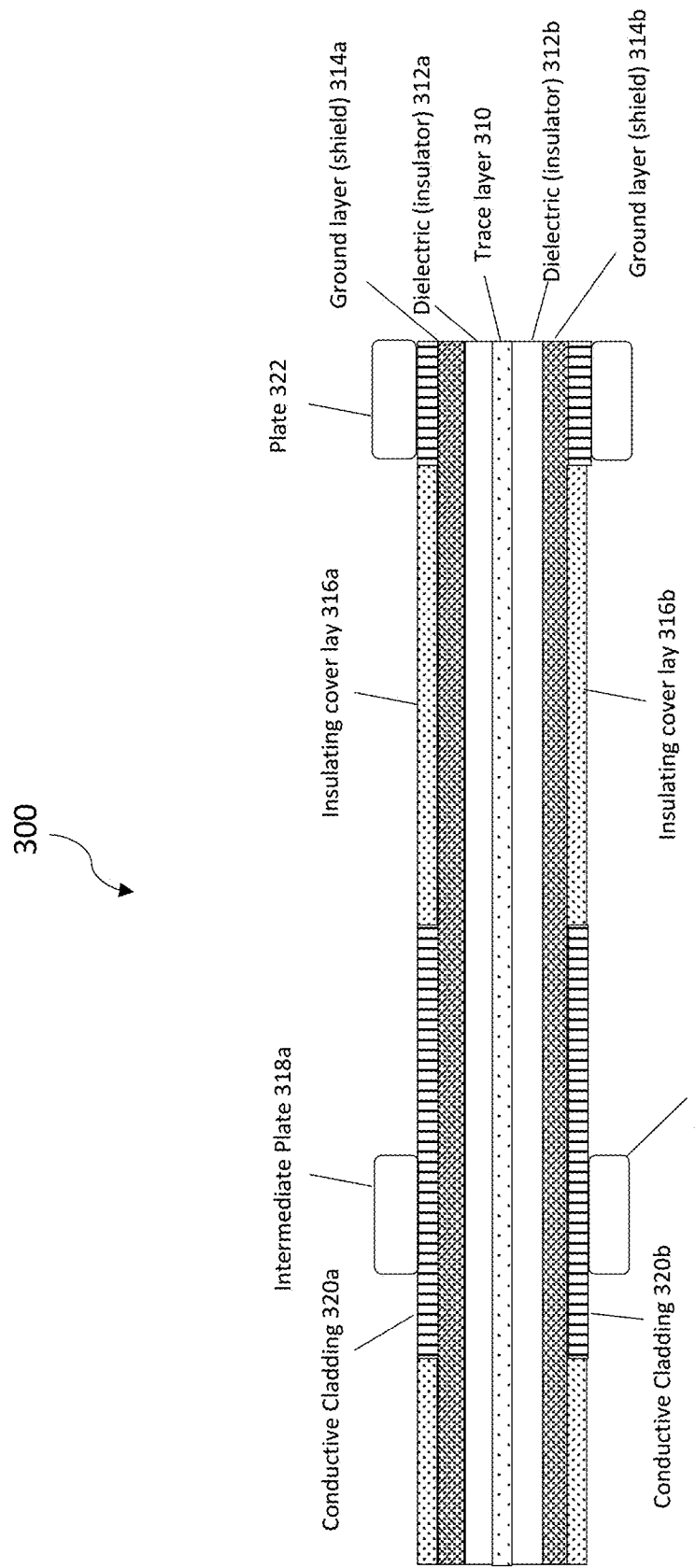
FIG. 3 illustrates different layers of the flex cable with thermally conductive cladding, in accordance with some embodiments.

Reference now is made to FIGS. 1-3, which are various views of a flex cable with thermally conductive cladding device 100, consistent with an illustrative embodiment. FIG. 1 is a simplified view of the flex cable with conductive cladding device, while FIG. 2 depicts the flex cable with conductive cladding device in more detail. FIG. 3 illustrates different layers of the flex cable with conductive cladding device. Reference is now made to FIG. 1, which illustrates a simplified side view of the flex cable with conductive cladding device, in accordance with some embodiments. In some embodiments, the flex cable with thermally conductive cladding device 100 includes a first plate 110*a*, a second plate 110*b*, an intermediate plate 112, and a conductive cladding 114. The flex cable is thermally connected to the first plate 110*a*, the second plate 110*b*, and the intermediate plate 112.

In various embodiments, the first plate 110a can be at a substantially higher temperature than the second plate 110b (i.e., T1>>T2). As a non-limiting example, the first plate can be at liquid helium temperature (i.e., T1=4K), and the second plate 110b can be at a cryogenic temperature (e.g., T2=0.01 K). The intermediate plate 112 is at a third temperature (T3) which is between the T1 and T2 (e.g., T3=0.1K). It is worth mentioning that, since the thermally conductive cladding 114 extends from the intermediate plate 112 along the length of the flex cable, throughout this disclosure, the terms "intermediate plate" and "clamping plate" are used interchangeably.

As shown in FIG. 1, the thermally conductive cladding 114 can be formed over portions of the flex cable above the intermediate plate 112 and extend toward the second plate 110b. Although the thermally conductive cladding 114 is extended from the intermediate plate 112 towards both the first plate 110a and the second plate 110b, in several embodiments, the length of the thermally conductive cladding 114 extended toward the first plate d1 is substantially smaller than the length of the thermally conductive cladding 114 extended toward the second plate 110b d2. In various embodiments, one or more of the first plate 110a and the second plate 110b are clamped to the flex cable. The intermediate plate 112 is clamped to the flex cable with a length of clamp denoted as dc. The total length of the thermally conductive cladding 114 (i.e., d1+d2+dc) is substantially larger than the length of clamp. As one direct result of utilizing the thermally conductive cladding 114, the heat transfer surface, hence the heat transfer rate, from the flex cable, is increased. Thus, the heat transfer rate in the presence of the thermally conductive cladding 114 is substantially higher than the heat transfer rate in the absence of the thermally conductive cladding 114. Due to the improved heat transfer, the flex cable will be better thermalized to the temperature of the intermediate plate.

Referring to FIG. 2 now, an overview of the flex cable with conductive cladding device is shown with more detail, in accordance with some embodiments. The flex cable with conductive cladding device may include three plates connected by a flex cable that carries electrical signals between a higher temperature plate at temperature T1 and a cold plate at temperature T2. The flex cable is clamped to the plates to make connections to the signal lines. In order to reduce the heat power flowing from T1 to T2, the flex cable may additionally be clamped to an intermediate plate at temperature T3, with the aim of bringing the temperature of the flex materials, in particular the highly conductive signal wires, close to this intermediate temperature.

As shown in FIG. 2, the flex cable with conductive cladding device includes a first plate 210a, a second plate 210b, an intermediate plate 212 and a thermally conductive cladding 214. Additionally, in the alternative, the first plate 210a and the second plate 210b can include a first clamp 216a, and a second clamp 216b, respectively. The intermediate plate 212 can include an intermediate clamp 218. The flex cable with conductive cladding device can be a specialized electrical cable designed to transmit electrical signals, power, and control signals while withstanding the extreme cold temperatures and mechanical stresses found in cryogenic environments, particularly within a dilution refrigerator. The flex cables can connect various components, sensors, and instruments in the dilution refrigerator and facilitate the operation of experiments at ultra-low temperatures, typically in the millikelvin (mK) range. In some embodiments, the flex cable can be made of a conductive material that can withstand extreme cold without becoming brittle or losing electrical conductivity, such as copper, aluminum, and superconducting materials.

As mentioned earlier, the conductivities of the flex materials and the geometry of the clamping area will often be such that the thermalization of the wire temperature to the intermediate temperature will be incomplete, allowing excess heat flux to reach the cold plate (the second plate 210b) causing it to warm unacceptably. In a dilution refrigerator, for example, the second plate 210b may be at a temperature of 10 mK or below and have limited cooling power. It is therefore desirable to limit such excess heat by maximizing the degree to which the flex cable can be thermalized to the temperature of the intermediate plate, T3. In some embodiments, thermalization can be greatly enhanced by adding the thermally conductive cladding 214 to the flex cable in the region of the clamp at the intermediate plate 212. In some embodiments, the thermally conductive cladding 214 is made of copper, gold or silver.

In various embodiments, the thermally conductive cladding 214 is only extended long enough to ensure that the flex cable is thermalized to the clamp at the intermediate plate temperature T2, but not longer. Thus, in such embodiments, an optimum length of the thermally conductive cladding 214 to reduce or to minimize the heat flowing to the low temperature stage is calculated, as described below.

FIG. 3 illustrates a side view of the layers of the flex cable with conductive cladding device, in accordance with some embodiments. In some embodiments, the flex cable 300 can include a trace layer 310, i.e., an inner layer or an electrically conductive signal wire, located between layers of dielectric 312a and 312b, which are covered by two ground layers 314a and 314b. The ground layers 314a and 314b can be covered by insulating cover lays 316a and 316b, i.e., outer layers. The trace layer 310 is a wire made of a highly electrically conductive materials, such as copper, to transport the signal, and is insulated by the layers of dielectric 312a and 312b. In some embodiments, the ground layers 314a and 314b are made of copper-nickel. The insulating cover lays 316a and 316b provide additional insulation to the flex cable 300. In an embodiment, insulation cover lays 316a and 316b can include PVC (Polyvinyl Chloride), PE (Polyethylene), Teflon (PTFE), polyimide (PI) and silicone.

In some embodiments, in order to increase the heat transfer at the intermediate plate 318, the thermally conductive cladding 320a and 320b on the flex cable is clamped at the intermediate plate 318, and can be extended toward the plate 322 with lower temperature. That is, the thermally conductive cladding 320a and 320b extend out from where they are clamped.

Figure 4:
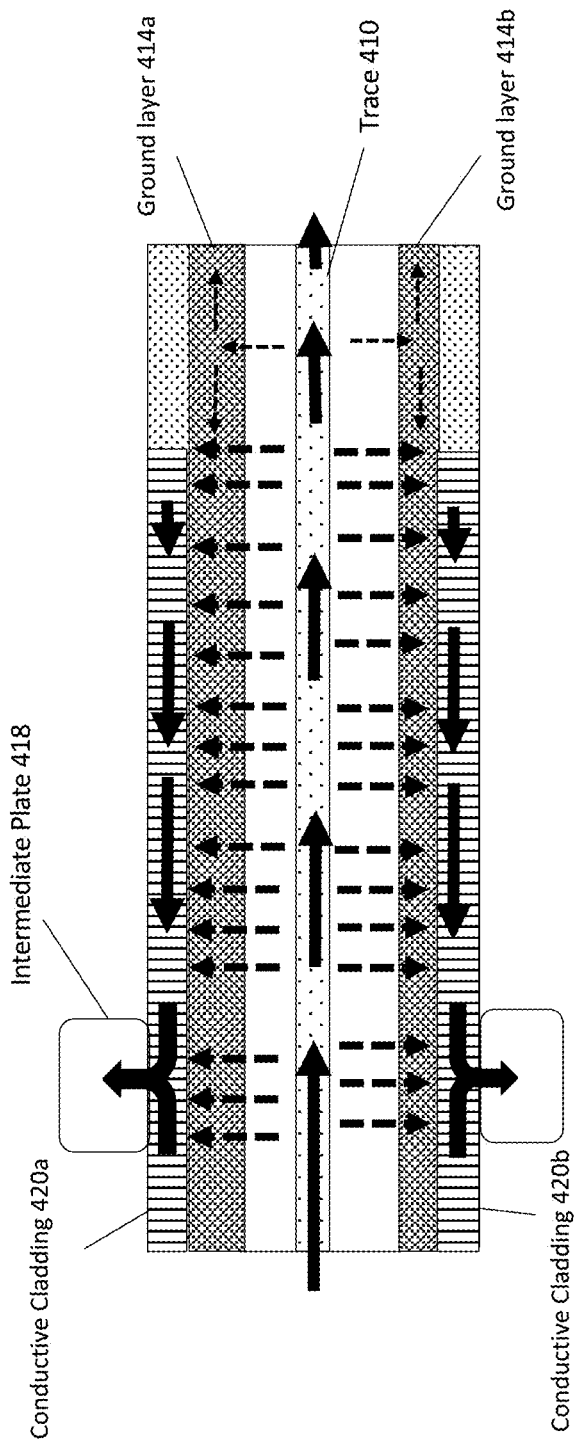
FIG. 4 illustrates the heat flow within a flex cable with thermally conductive cladding, in accordance with some embodiments.

FIG. 4 illustrates the heat transfer mechanism within a flex cable with conductive cladding device, in accordance with some embodiments. The arrows represent the flow of heat flux along the signal wire and from the wire to the clamp. As shown, the thermally conductive cladding increases the heat flux that flows to the clamp at the intermediate plate 418, and therefore improves thermalization to that temperature.

As shown by arrows, heat can transfer in either in a perpendicular direction, i.e., from the trace toward the outer layers of the flex cable and eventually to the thermally conductive cladding, or along the flex cable, i.e., from the left side to the right side. The thermally conductive cladding 420a and 420b include a material, e.g., copper, gold or silver, with a thermal conductivity that is substantially higher than the thermal conductivities of other materials in the flex cable. As such, the heat transfer from the flex cable through the thermally conductive cladding 420a and 420b dominates the overall heat transfer. It should be noted that, the portion of heat transfer that occurs though the ground layers 414a and 414b will be relatively small due to its lower thermal conductivity. In some embodiments, in order to increase the heat transfer, the length of the thermally conductive cladding 420a and 420b is increased to be substantially longer than the length of the intermediate plate 418, as longer conductive cladding length is equivalent to extending the intermediate plate 418 and the clamp, which can draw more heat from the trace 410. It is worth noting that, the extent of the heat transfer, i.e., the heat transfer rate, is indicated qualitatively by the length and width of the arrows in FIG. 4.

Figure 5A:
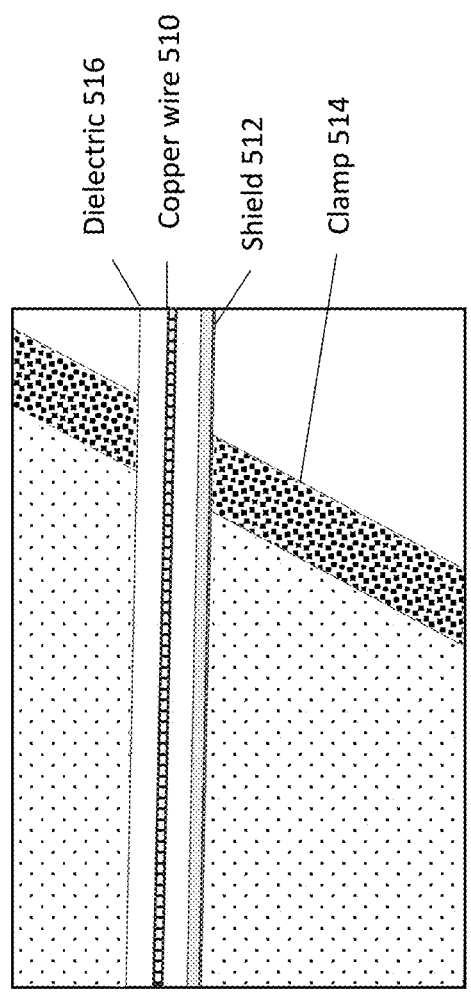
FIG. 5A illustrates details of the contact of the flex as it contacts the intermediate plate showing the shield, the dielectric, and signal wire, for purposes of finite element calculations.
Figure 5B:
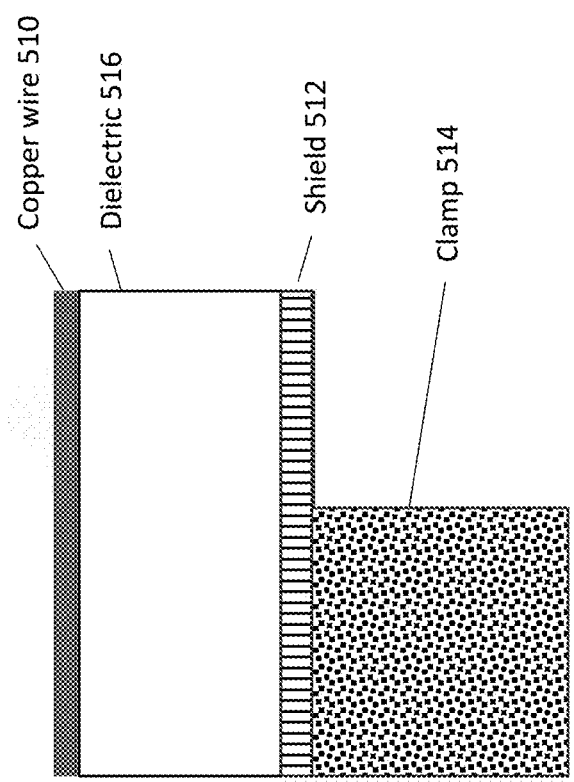
FIG. 5B illustrates a cross section view of the contact of the flex as it contacts the intermediate plate showing the shield, the dielectric, and the signal wire, for purposes of finite element calculations.
Figure 5C:
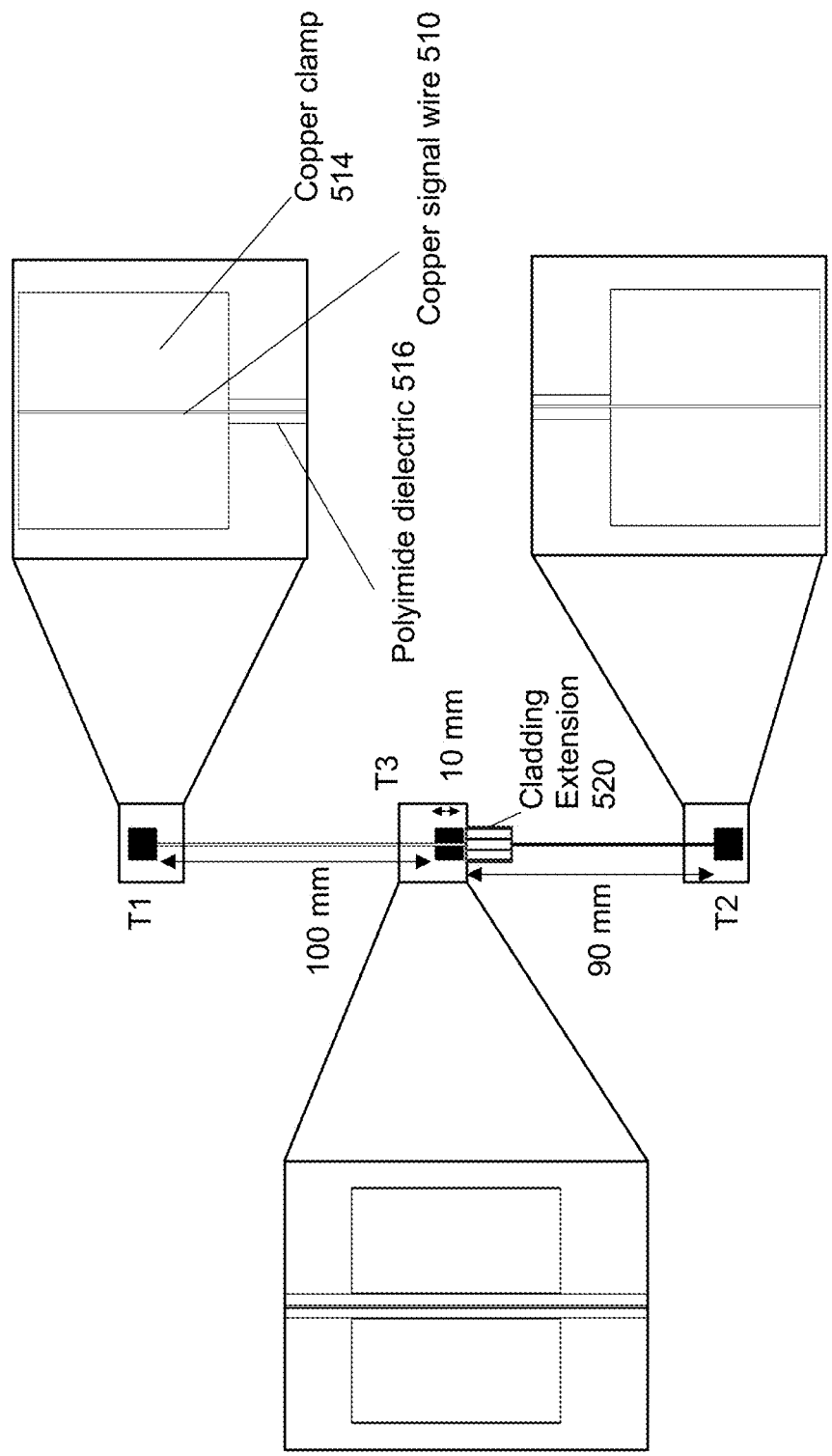
FIG. 5C illustrates an overview of the geometry and dimensions used in quantitative finite element calculations, in accordance with some embodiments.

Numerical calculations are performed and support the value of extending a conductive cladding. Calculations have been carried out using the thermal simulation module of the SolidWorks 3-dimensional modelling software package. The assumed geometries for purposes of calculation are given in FIGS. 5A-5C. FIG. 5A illustrates details of the contact of the flex as it contacts the intermediate plate showing the shield (ground plane), the dielectric insulator, and electrically conducting signal wire. FIG. 5B illustrates a cross section view of the contact of the flex as it contacts the intermediate plate showing the shield, the dielectric, and the signal wire. FIG. 5C illustrates an overview of the geometry and dimensions used in quantitative finite element calculations. The signal wire is assumed to have perfect contact with the hot and the cold plates at T1 and T2, and to have a contact to the intermediate plate at T3 only through a layer of dielectric and shield. The temperature dependent thermal conductivities of the copper wire, the ground layer (shield), and the polyimide dielectric used for the calculations were taken as 156T, 0.227T and 3.3E-3T W/m·K, respectively, where T is the temperature. Considering the symmetry perpendicular to the wire plane, only one layer of dielectric and shield are simulated. This simplification is equivalent to the full calculation using thermal conductivities that are half their actual values.

Analytical calculations based on the differential equations of heat flow can also be employed to estimate the ideal cladding length and give insight into the key parameters that determine the optimal cladding length. The basic differential equation for determining the temperature distribution in the signal wire is:

$$\frac{d}{dx}\left[A_w K_w(T)\frac{dT}{dx}\right] = q(x),$$

where T(x) is the wire temperature as a function of distance x, $A_w$ is the cross-sectional area of the wire, $K_w(T)$ is the wire thermal conductivity and q(x) is the heat flow the heat flow out of the wire per unit length.

For a thin rectangular wire of width w encapsulated within a thin insulating dielectric of thickness $t_i$, the cooling per unit length of the wire in the cladding region is:

$$q(x) = -\frac{n_{sides}w}{t_i}\int_{T(x)}^{T_p} K_i(T)\,dT,$$

where $n_{sides}$ is either 1 or 2, depending on whether the wire is cooled from one side only, or two. It should be noted that, in the case of cable shapes other than thin rectangular shapes, an appropriate coefficient, other than $n_{sides}$, can be calculated.

If the thermal conductivities of the wire and insulator are temperature dependent with the form $K_w(T)=K_{w,0}T^\alpha$ and $K_i(T)=K_{i,0}T^\alpha$, then the two equations above can be combined and written as $$\frac{d}{dx}\left[T^\alpha\frac{dT}{dx}\right] = \frac{1}{\alpha+1}\frac{K_i}{K_w}\frac{n_{sides}}{t_w t_i}(T^{\alpha+1} - T_p^{\alpha+1}),$$

where $t_w$ is the thickness of the wire.

A result of the analysis is that a characteristic length scale emerges from the solution which determines the distance over which the wire will be thermalized to the temperature of the cladding. This characteristic length scale is given by:

$$L_t = \left(\frac{K_w}{K_i}\frac{t_w t_i}{n_{sides}}\right)^{1/2}$$

By making the thermally conductive cladding length equal to a small multiple of $L_t$, the signal wire will be effectively cooled to the temperature of the intermediate plate, which will reduce the heat flow to the low temperature stage. In practice, the thermally conductive cladding length should be chosen according to $L_c = A\,L_t$, where A has a value between 2 and 6.

As an example of the efficacy of the cladding layer, a flex cable with a copper wire traveling from the intermediate stage at 100 mK temperature to the low temperature stage at 10 mK is considered. The wire is 10 micrometers thick and has thermal conductivity $K_w(T)=75T$ in SI units. The wire is insulated with 100 micrometer thick insulation having thermal conductivity $K_i(T)=10^{-3}T$ in SI units. When cooled from both sides (i.e., $n_{sides}=2$), the characteristic length scale as defined above is $L_t=6.1$ mm. Assuming that the incoming temperature of the wire entering the intermediate stage is T(0)=200 mK, the heat flow to the low temperature stage is given as shown in FIG. 7B. The heat flow is minimized when the cladding length is 31 millimeters long, or $L_c=5.1\,L_t$. Again, the numerical results confirm that there is no advantage in extending the cladding beyond this distance because the signal wire is fully thermalized at this distance and the shortening of the distance from the cladding to the low temperature stage undesirably increases the heat flow.

Other examples of finding the optimal cladding length are summarized in Table 1. The optimal cladding length depends on the details of the cable characteristics, such as thermal conductivities and geometry. Nevertheless, the ratio of optimal cladding length to the characteristic thermalization length $A=L_c/L_t$ is typically in range between 2 and 6. Examination of these results leads to an empirical approximation for A given by $A=3.4\log L_0/L_t$, where $L_0$ is the length of the cable from the intermediate plate to the cold plate. This expression for A provides a useful guide for determining the cladding length that reduces the heat flux to within a few percent of the optimum for the conditions studied.

TABLE 1

Optimal cladding length and ratio $A = L_c/L_t$ for various cable lengths $L_0$ and wire thermal conductivities $K_w$. Other parameters are assumed fixed, with $t_w$ = 10 um, $t_i$ = 100 um, and $K_i$ = 0.001 T. All results were obtained for initial wire temperature T(0) = 200 mK and with intermediate plate temperature of T3 = 100 mK and cold plate temperature T2 = 10 mK, except for the last row where initial wire temperature T(0) = 150 mK.

| T2-T3 length, $L_0$ (mm) | $K_w$ (SI units) | $L_t$ (mm) | $L_c$ (mm) | $A = L_c/L_t$ |
|---|---|---|---|---|
| 300 | 75 T | 6.12 | 34 | 5.55 |
| 200 | 75 T | 6.12 | 31 | 5.06 |
| 150 | 75 T | 6.12 | 29 | 4.70 |
| 125 | 75 T | 6.12 | 28 | 4.57 |
| 100 | 75 T | 6.12 | 26 | 4.25 |
| 75 | 75 T | 6.12 | 23 | 3.75 |
| 50 | 75 T | 6.12 | 19 | 3.1 |
| 30 | 75 T | 6.12 | 14 | 2.29 |
| 200 | 200 T | 10 | 45 | 4.5 |
| 200 | 20 T | 3.16 | 18 | 5.7 |
| 200 | 75 T | 6.12 | 26 | 4.25 |

Figure 6A:
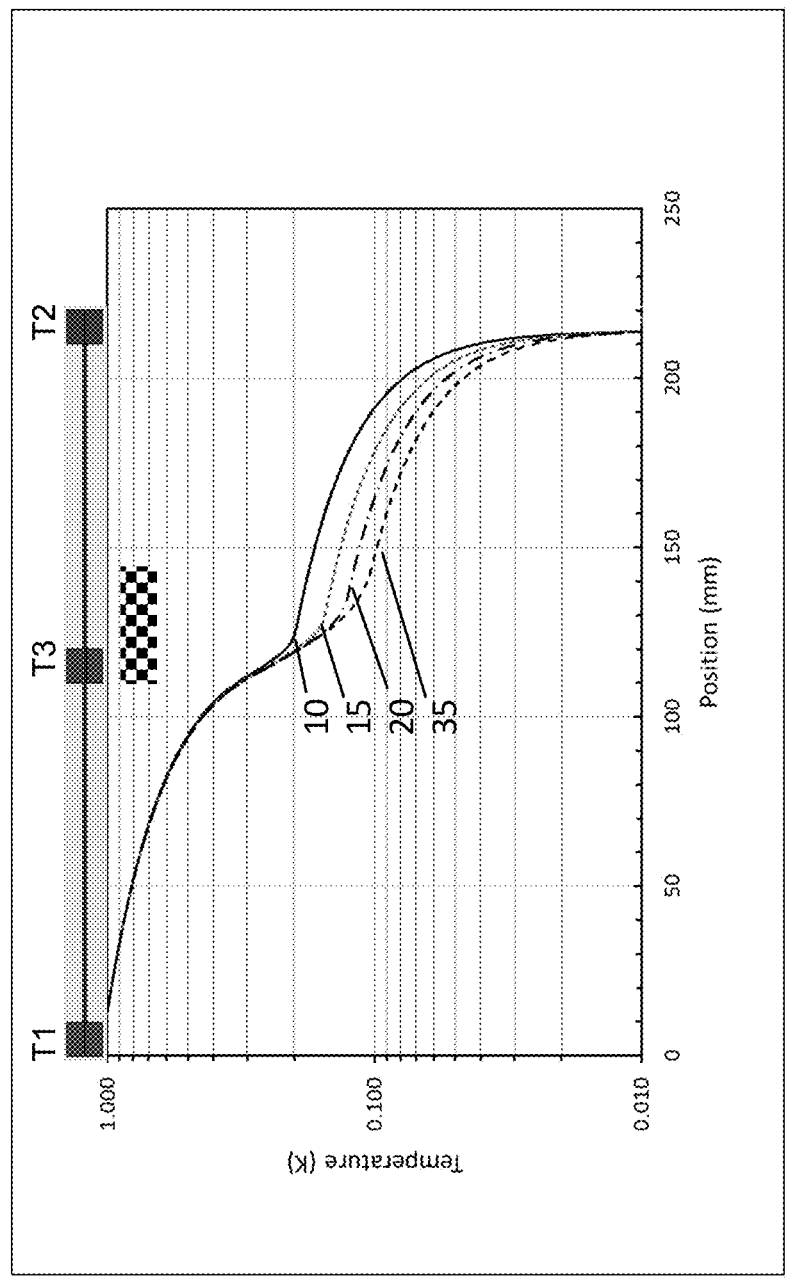
FIGS. 6A-6B illustrate simulated temperature distributions with cladding with different lengths in millimeters, in accordance with some embodiments.
Figure 6B:
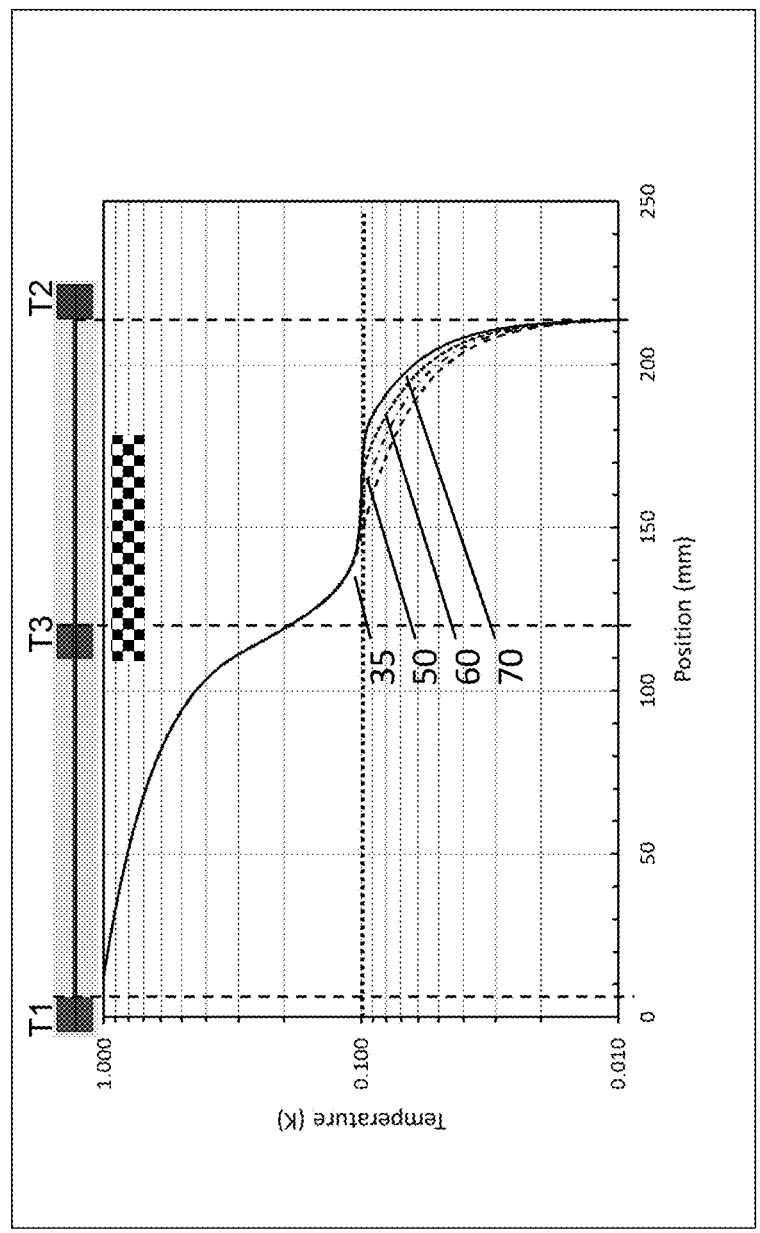

Reference is now made to FIGS. 6A-6B, which illustrate results of simulating the temperature profile of the flex cable using finite element calculations. Alternatively, in some embodiments, analytical methods are used to calculate the temperature of the trace wire based on the location and length of the thermally conductive cladding.

For calculation purposes, T1, T3 and T2 are set to 1K, 100 mK and 10 mK, respectively. The signal wire has a cross section of about 10 micrometers thick by 100 micrometers wide, the polyimide dielectric and the shield have a width of 1 mm and thicknesses of 100 micrometers and 18 micrometers, respectively. The clamps are made of copper as the signal wire with the dimensions of 10×10×4 mm, centered along the wire at positions shown in FIGS. 6A-6B. All interfaces are perfectly conducting except that of the wire to the polyimide, which has an interfacial resistance of 2 K/m². W along the length of the interface. FIG. 6A shows the simulated temperature distribution along the signal wire, from T1=1 K at the left to 10 mK=T2 at right, with the intermediate clamp at T3=100 mK. In this case, with a 10 mm length of cladding, the thermalization is insufficient, with the signal wire reaching approximately 200 mK at the end of the clamp. The wire temperature does not reach 100 mK until almost 20 mm from the cold plate, 60 mm further along the wire than the T3 clamp.

FIG. 6A illustrates the simulated temperature distributions with longer cladding, extended in the direction of T2, with total lengths of 15, 20, and 35 mm, as well as the original 10 mm case. As can be seen, increasing the cladding length pulls the point at which the wire reaches the 100 mK temperature of the intermediate plate back towards it. In the 35 mm case, the wire reaches 100 mK just at the end of the cladding, which is very close to optimum. The design criteria for best performance are that the cladding should be long enough to pull the wire temperature to T3 at the end of the cladding but not longer. Increasing the length further extends the T3 temperature of the wire towards the cold plate. Equivalently, such an increase can prevent the wire from cooling further once it has reached T3 until it leaves the part of the cable with cladding.

FIG. 6B illustrates the simulated temperature distributions with still longer cladding, extended farther in the direction of T2, with total lengths of 35, 50, and 60 and 70 mm. As can be seen, the wire temperature is indeed held close to T3 farther than needed, with the curves becoming flat for the longer cases. These over-extended claddings lead to an increase in heat power flow to the cold stage as anticipated.

Figure 7A:
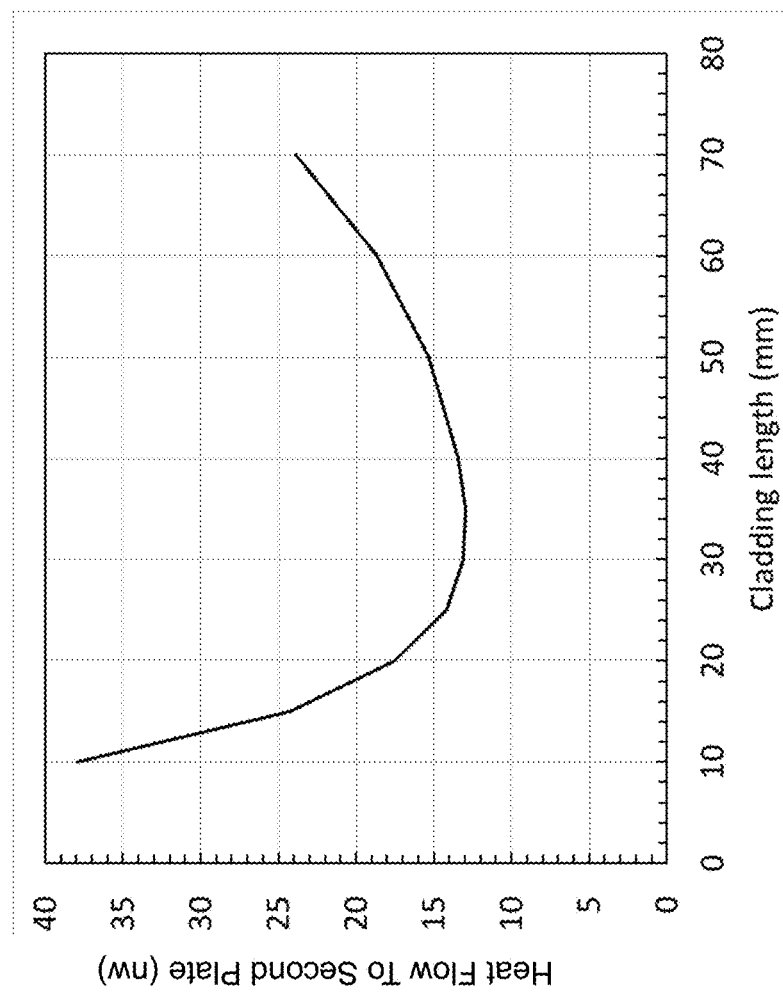
FIG. 7A illustrates simulated heat flow to the cold plate versus cladding lengths, in accordance with some embodiments.
Figure 7B:
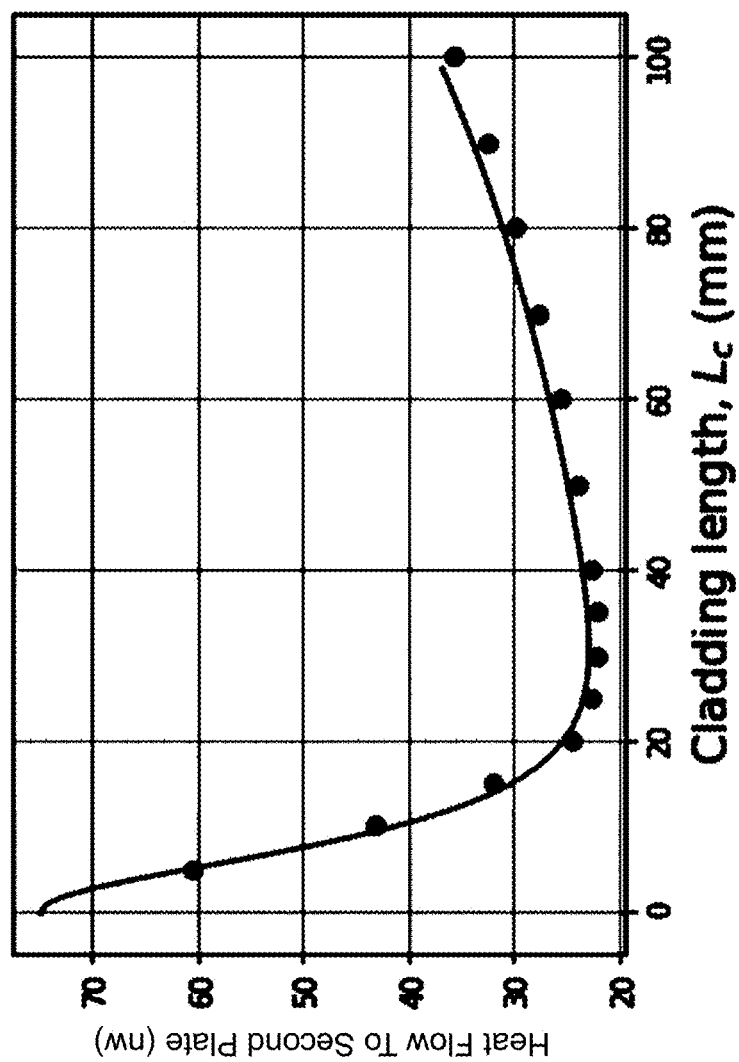
FIG. 7B illustrates an example of heat flow to the cold plate as a function of cladding length, in accordance with some embodiments.

FIGS. 7A-7B illustrate the heat flow to the cold plate based on the length of the thermally conductive cladding. FIG. 7A illustrates simulated heat flow to the cold plate versus cladding length based on finite element calculations. As clearly shown, the heat power to the cold stage passes through a minimum as a function of cladding length, with an optimum length for this case of about 35 mm. FIG. 7B illustrates an example of heat flow as a function of cladding length. The plot shows the existence of an optimum cladding length, which is 31 millimeters in this case. It should be noted that, the points are derived from a numerical simulation and the continuous curve is resulted from an analytical calculation.

Figure 8:
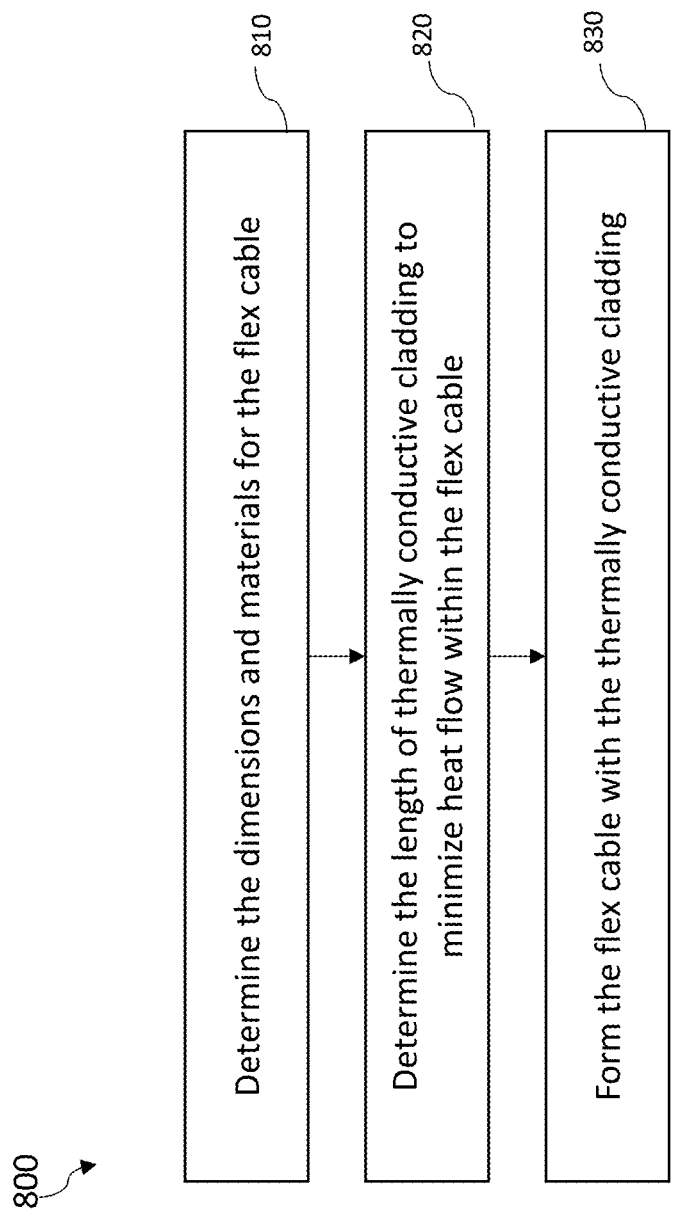
FIG. 8 illustrates a block diagram of a method for forming the flex cable with thermally conductive cladding device, in accordance with some embodiments.

FIG. 8 illustrates a block diagram of method 800 for forming the flex cable with conductive cladding device, in accordance with some embodiments. As shown by block 810, the dimensions and materials for the flex cable are determined.

As shown by block 820, based on the dimensions and material characteristics, the length of the thermally conductive cladding is determined so as to minimize heat flow within the flex cable.

As shown by block 830, the flex cable is formed, including the thermally conductive cladding.

Figure 9:
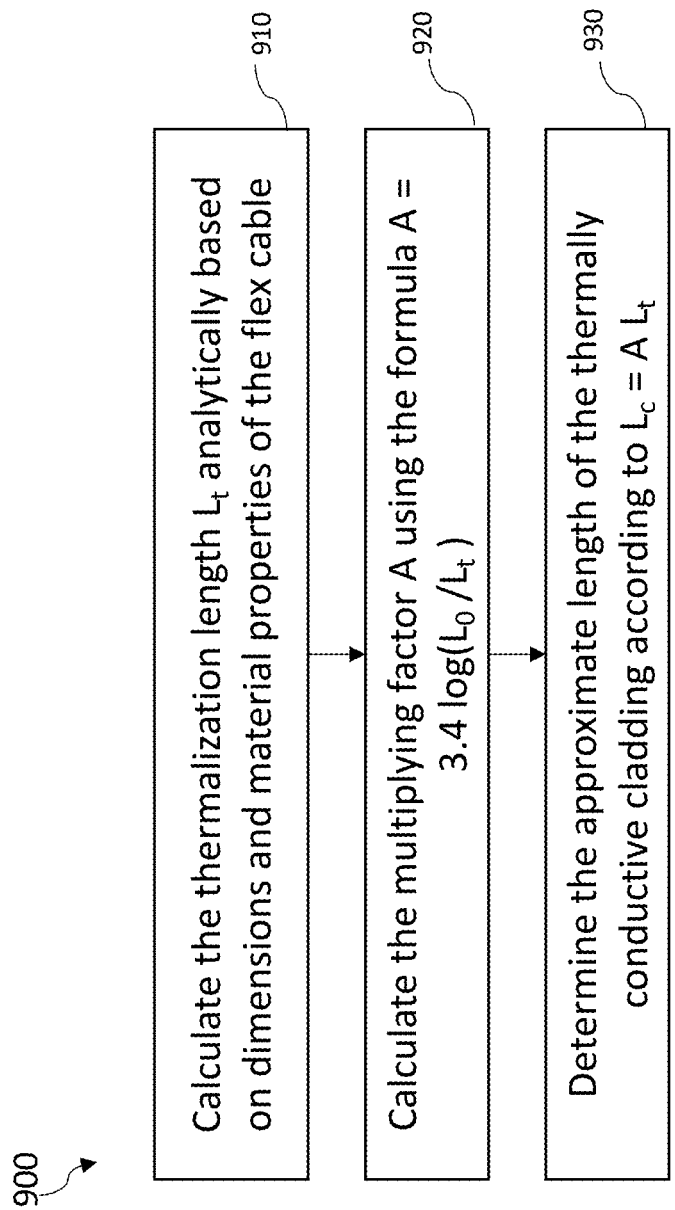
FIG. 9 illustrates a block diagram of a method for determining a length of the thermally conductive cladding by an analytical approach, in accordance with some embodiments.

FIG. 9 illustrates a block diagram of a method 900 for determining a length of the thermally conductive cladding by an analytical approach, in accordance with some embodiments. As shown by block 910, the thermalization length $L_t$ of the flex cable is determined based on dimensions and material properties of the flex cable.

As shown by block 920, the multiplying factor is determined based on an analytical solution of the equation A=3.4 log $L_0/L_t$, where $L_0$ is the length of the cable from the intermediate plate to the cold plate.

As shown by block 930, the length of the thermally conductive cladding is calculated based on $L_c = A L_t$.

Figure 10:
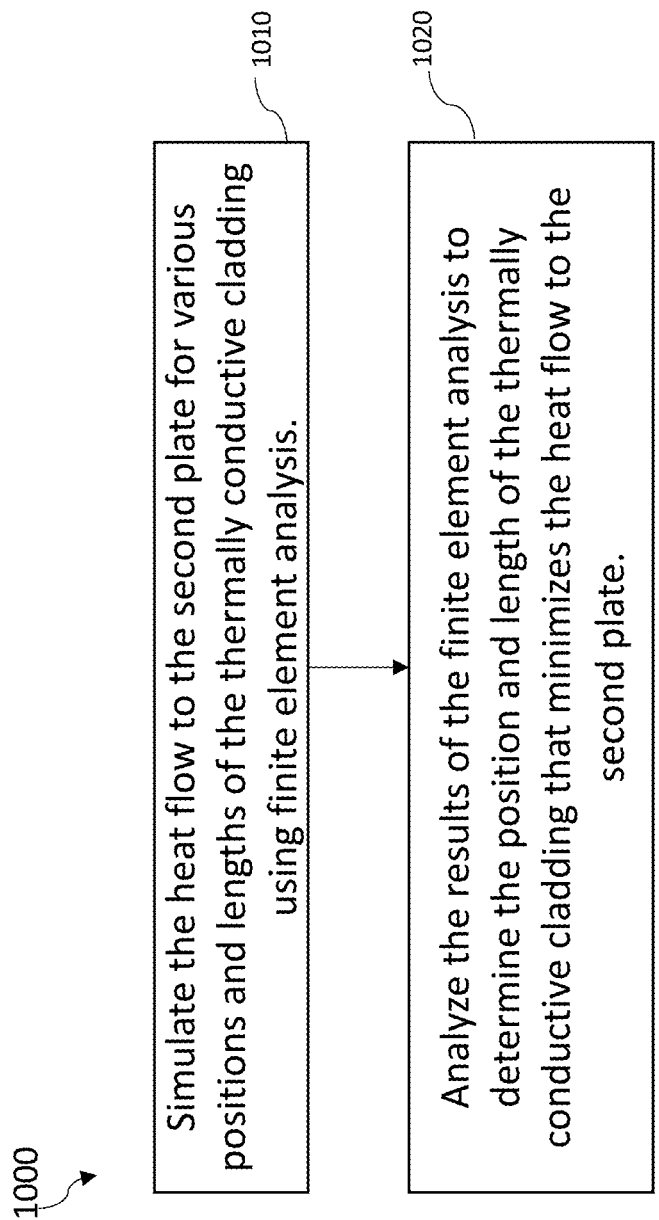
FIG. 10 illustrates a block diagram of a method for determining a length of the thermally conductive cladding by a numerical approach, in accordance with some embodiments.

FIG. 10 illustrates a block diagram of a method for determining a length of the thermally conductive cladding by a numerical approach, in accordance with some embodiments. As shown by block 1010, the heat flow to the second plate is simulated for various positions and lengths of the thermally conductive cladding using finite elements analysis.

As shown by block 1020, the results of the finite element analysis are analyzed to determine the position and length of the thermally conductive cladding that minimizes the heat flow to the second plate.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure Is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A system comprising:
   a cable passing from a first plate to a second plate via an intermediate plate, wherein the cable is thermally connected to the first plate, the second plate, and the intermediate plate;
   an attachment coupling the cable to the intermediate plate; and
   a thermally conductive cladding connected to an outer surface of the cable and extended a first length from the attachment toward the second plate, wherein a total length of the thermally conductive cladding is larger than a total length of the attachment.

2. The system of claim 1, wherein the cable comprises an intermediate layer separating the outer layer and an inner layer, and wherein a length of the thermally conductive cladding is determined by $L_c = AL_t$ and $$L_t = \left(\frac{K_w}{K_i} \frac{t_w t_i}{n_{sides}}\right)^{1/2}$$

wherein:
   $K_w$ and $K_i$ are thermal conductivities of the inner layer and the intermediate layer, respectively;
   $t_w$ and $t_i$ are thicknesses of the inner layer and the intermediate layer, respectively;
   $n_{sides}$ is 1 when the thermally conductive cladding is applied on one side of the flex cable, and 2, when the thermally conductive cladding is applied on two sides of the flex cable; and
   A is a multiplier between 2 and 6.

3. The system of claim 2, wherein the multiplier A is determined by $$A = 3.4 \log(L_0/L_t)$$

wherein $L_0$ is a distance from the intermediate plate to the second plate.

4. The system of claim 2, wherein a length of the thermally conductive cladding is determined by finite element calculations to minimize heat flow to the second plate.

5. The system of claim 1, wherein:
   the thermally conductive cladding includes a first material with a first thermal conductivity;
   the outer layer includes a second material with a second thermal conductivity; and
   wherein the first thermal conductivity is higher than the second thermal conductivity.

6. The system of claim 1, wherein:
   the first plate is at a first temperature;
   the second plate is at a second temperature; and
   the second temperature is lower than the first temperature.

7. The system of claim 6, wherein the intermediate plate is at a third temperature that is between the first temperature and the second temperature.

8. The system of claim 1, wherein the thermally conductive cladding is configured to decrease a heat load to the second plate when the thermal conduction to the intermediate plate is increased.

9. The system of claim 1, wherein the thermally conductive cladding is further extended a second length from the attachment toward the first plate.

10. A system comprising:
a cable connecting a first plate and a second plate via an intermediate plate, wherein the first plate is at a first temperature and the second plate is at a second temperature, the second temperature being lower than the first temperature;
an attachment connecting the cable to the intermediate plate; and
a thermally conductive cladding connected to the cable, wherein the thermally conductive cladding is extended a first length from the attachment toward the first plate and a second length from the attachment toward the second plate.

11. The system of claim 10, wherein the intermediate plate is at an intermediate temperature between the first temperature and the second temperature.

12. The system of claim 10, wherein the cable comprises an intermediate layer separating an outer layer and an inner layer, and wherein a length of the thermally conductive cladding is determined by $L_c = AL_t$ and $$L_t = \left(\frac{K_w}{K_i} \frac{t_w t_i}{n_{sides}}\right)^{1/2}$$

wherein:
$K_w$ and $K_i$ are thermal conductivities of the inner layer and the intermediate layer, respectively;
$t_w$ and $t_i$ are thicknesses of the inner layer and the intermediate layer, respectively;
$n_{sides}$ is 1 when the thermally conductive cladding is applied on one side of the flex cable, and 2, when the thermally conductive cladding is applied on two sides of the flex cable; and
A is a multiplier between 2 and 6.

13. The system of claim 12, wherein the multiplier A is determined by $$A = 3.4 \log(L_0/L_t)$$

where $L_0$ is the distance from the intermediate plate to the second plate.

14. The system of claim 12, wherein a length of the thermally conductive cladding is determined by finite element calculations to minimize heat flow to the second plate.

15. The system of claim 12, wherein:
the thermally conductive cladding includes a first material with a first thermal conductivity;
the outer layer includes a second material with a second thermal conductivity; and
the first thermal conductivity is higher than the second thermal conductivity.

16. A method of fabricating a flex cable, the method comprising:
determining a length of a thermally conducting cladding to minimize heat flow within the flex cable; and;
forming the flex cable with the thermally conductive cladding, wherein forming the flex cable comprises:
forming the flex cable passing from a first plate to a second plate via an intermediate plate;
thermally connecting the flex cable to the first plate, the second plate, and the intermediate plate;
attaching the flex cable to the intermediate plate via an attachment, wherein the flex cable comprises an inner layer, and an outer layer separated by an intermediate layer, and wherein determining a length of the thermally conductive cladding is performed based on $L_c = AL_t$ and $$L_t = \left(\frac{K_w}{K_i} \frac{t_w t_i}{n_{sides}}\right)^{1/2}$$

wherein:
$K_w$ and $K_i$ are thermal conductivities of the inner layer and the intermediate layer, respectively;
$t_w$ and $t_i$ are thicknesses of the inner layer and the intermediate layer, respectively;
$n_{sides}$ is 1 when the thermally conductive cladding is applied on one side of the flex cable, and 2, when the thermally conductive cladding is applied on two sides of the flex cable; and
A is a multiplier between 2 and 6.

17. The method of claim 16 further comprising:
determining the multiplier A by $$A = 3.4 \log(L_0/L_t)$$

where $L_0$ is the distance from the intermediate plate to the second plate.

18. The method of claim 16, wherein a length of the thermally conductive cladding is determined by finite element calculations to minimize heat flow to the second plate.

19. The method of claim 16, further comprising extending the thermally conductive cladding a second length from the attachment toward the first plate.

* * * * *